United States Patent [19]

Matadobra

[11] Patent Number: 5,573,352
[45] Date of Patent: Nov. 12, 1996

[54] UNITARY DOOR ROUTING TEMPLATE

[75] Inventor: Joseph Matadobra, Upland, Calif.

[73] Assignee: Trimco Finish, Inc., Santa Ana, Calif.

[21] Appl. No.: 287,490

[22] Filed: Aug. 8, 1994

[51] Int. Cl.⁶ .............................. B27C 5/10; B23B 49/02; B23C 9/00
[52] U.S. Cl. .................. 409/132; 144/144.51; 408/72 R; 408/115 R; 409/178
[58] Field of Search ..................................... 409/131, 132, 409/130, 175, 178, 179, 180; 408/108, 115 R, 72 R; 144/144.5 R, 144.5 GT

[56] References Cited

U.S. PATENT DOCUMENTS

| | | | |
|---|---|---|---|
| 2,832,154 | 4/1958 | Bauer | 144/144.5 R |
| 2,843,167 | 7/1958 | Rushton | 144/76 |
| 3,302,674 | 2/1967 | Russell et al. . | |
| 3,327,573 | 6/1967 | Prussiano . | |
| 3,392,607 | 7/1968 | Gieseke . | |
| 3,500,884 | 3/1970 | Hand et al. | 144/3 |
| 4,202,388 | 5/1980 | Wieting | 144/144.5 R |
| 4,230,164 | 10/1980 | Mericle | 144/144.5 R |
| 4,306,823 | 12/1981 | Nashlund | 408/108 X |
| 4,445,277 | 5/1984 | Keefe | 408/115 R X |
| 4,715,125 | 12/1987 | Livick | 408/115 R X |
| 4,813,826 | 3/1989 | Riedel | 408/108 |
| 5,114,285 | 5/1992 | Brydon | 408/115 R |
| 5,222,845 | 6/1993 | Goldstein et al. | 408/103 |

Primary Examiner—Steven C. Bishop
Attorney, Agent, or Firm—Plante & Strauss

[57] ABSTRACT

A unitary door routing template for routing hardware mounting apertures in doors is provided which affords expedient placement of the template and the cutting of hardware mounting holes while minimizing expense and hazards to operating personnel. The template comprises two elongated, planar, unobstructed, opposing sides for engaging the front and back sides of a door, the template sides being integrally formed with and extending generally perpendicular to an end plate which engages the door edge. The planar opposing sides are spaced from each other at the end plate by a distance equal to or slightly greater than the thickness of the door and, preferably, gradually converge away from the end plate so that, when placed over the door, they provide a stabilizing grip on the door surfaces. The entire template, and particularly the template in the vicinity of the router guide holes, is preferably formed of flexible friable material, such as plastic, and has a thickness greater than ¼ inch to prevent disintegration of carbide router bits in use due to kick-back and contact of the bit with the template.

16 Claims, 3 Drawing Sheets

UNITARY DOOR ROUTING TEMPLATE

FIELD OF THE INVENTION

This invention relates to door routing templates, and in particular, to a unitary router template which affords easy placement and one step cutting of door hardware mounting holes.

BACKGROUND OF THE INVENTION

The art is replete with a wide variety of door operating hardware, such as latches, knobs, locksets, etc., available for mounting on uncut doors and of a similar variety of devices for cutting the required apertures in doors to allow installation of such hardware. Such installation devices range from the simplest, and most often totally ineffectual, paper templates sometimes provided with door hardware to complex multi-step drilling and routing devices which, for the most part, are so expensive that their cost is well beyond the range of the infrequent user and, in particular, cannot be justified by the great majority of homeowners who often install only a few doors, at most, over a long period of time. Obviously, such use does not justify the expenditure of several hundreds of dollars for a device for cutting door hardware mounting apertures. Nevertheless, the cost of such devices is well justified where doors are being repeatedly being cut such as in door finishing operations. Furthermore, the devices available for door hardware installation often require a multiplicity of steps including template mounting adjustments, pilot hole drilling followed by boring or routing in a separate operation after the template has been removed or another template installed in its place. Again, when only several doors are being installed, such multi-step operations, which may be well justified for mass production, only inordinately complicate on-site installations involving only a few work pieces.

SUMMARY OF THE INVENTION

The present invention recognizes the limitations of the complicated and expensive prior art devices by providing a relatively inexpensive yet effectual door hardware mounting template. This template comprises a unitary (one-piece) structure capable of effectively mounting door operating hardware in one simple cutting operation, the template having two elongated, planar, unobstructed opposing sides for engaging the front and back surfaces of a door close to the edge of the door, the planar opposing sides being integrally formed with and extending perpendicular to an end plate which engages the planar edge of the door during the routing operation. As noted, the template is designed for a simple, one-step router cutting operation and, therefore, at least one side of the template presents at least one router guide hole for guiding the collar of a router bit during the cutting operation. Since most door operating hardware is intended for mounting in a through cut hole having the same diameter through the thickness of the door, the template, when designed for installation of such hardware, optimally presents corresponding coaxially aligned holes on the opposing planar sides of the template, so that the router can be used from each side of the door to cut the hole partially through from each side, meeting somewhere near the center.

Due to the inexpensive construction of these templates, they need not be variable, thereby avoiding the necessity of adjustment, and different templates can be provided for each different type of hardware to be installed.

I have found that particularly significant advantages result from the use of friable material, such as plastic, in construction of the template, at least in the area of the router guide hole, to prevent disintegration of the router bit during cutting due to router bit kick-back. Carbide bits have found almost universal use for many router operations including the installation of door hardware, since they have the advantage of long life due to cutting edge sharpness and hardness. However, I have found, particularly with the use of these templates, that significant hazard can be presented to the operator by the use of templates formed of hard materials such as metals. Router bits often snag on hard spots such as grain discontinuities during cutting and kick-back with the result that the carbide bit may contact the guide hole edge and shatter, spraying pieces shattered router bit out of the hole at very high velocity. The use of friable material for template construction mitigates this hazard. I have also found that the use of template thicknesses in the vicinity of the guide holes greater than ¼ inch increases router control sufficiently to reduce the possibility of router kick-back to the point that the blade will contact the guide hole and present any danger to the operator or damage the router template.

Thus these templates enable a simple one-step cutting operation, meaning that only one cutting step is required per aperture and that no drilling of pilot holes followed by boring or routing is required for the placement of door hardware. These operating advantages result in expeditious placement of the door hardware which is facilitated even further by the simplicity of template placement. These templates are inexpensive to manufacture and, therefore, can be made readily available to infrequent users such as homeowners and carpenters who may install doors only infrequently on site. They reduce hazards to operators and other personnel by minimizing the risk of carbide bit disintegration due to bit kick-back or recoil (especially in hard woods), and the templates will not mar the surface even of finely finished doors due to the smooth undersurfaces which are made possible by the overall template design. Furthermore, they can be employed with all of the above-noted advantages to form holes of essentially any size and shape such as elliptical or elongated holes that, at best, would require a multiplicity of operations using other even more expensive devices. These templates do not require the use of expensive special boring equipment such as lock boring sets but can be used very effectively with general purpose routers.

DESCRIPTION OF THE DRAWINGS

The accompanying drawings illustrate several embodiments of the invention, in which.

DETAILED DESCRIPTION

Figure 1:
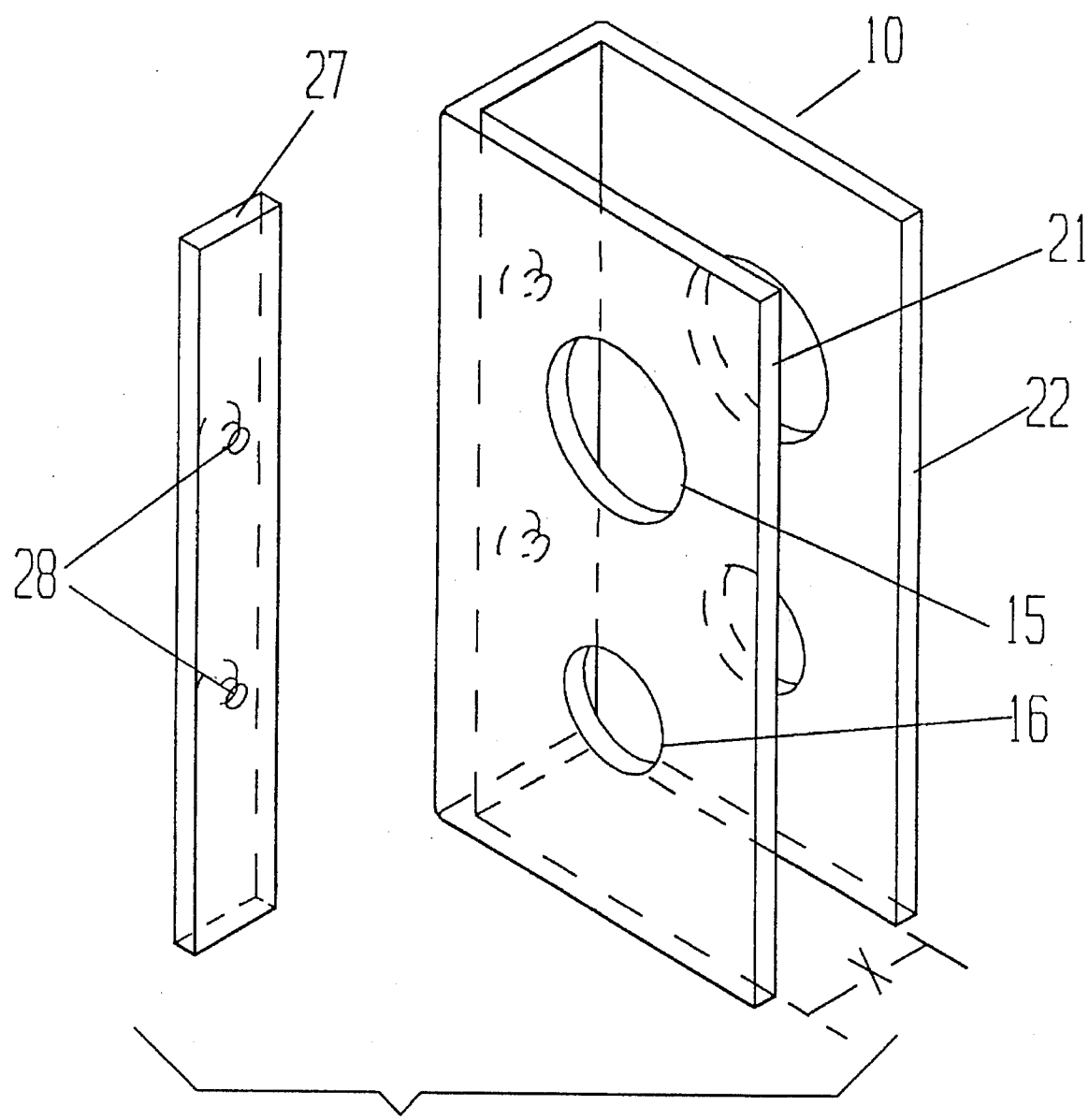
FIG. 1 is an isometric view of a unitary router template in accordance with this invention in combination with a spacer which can be employed to vary the spacing of the router holes from the door edge.

Referring now to the drawing, FIG. 1 illustrates one embodiment of the unitary template in accordance with this invention, 10, having front and back smooth planar surfaces 21 and 22, respectively, which, due to their smooth exterior surfaces, present an unobstructed work surface for routing.

Sides 21 and 22 further have smooth interior surfaces which will not mar the surface of the working piece. The template sides are joined by edge 24 which, as illustrated, also has smooth interior surface for abutting the door edge and establishing the accurate placement of the template. Holes 15 and 16 are each bored coaxially in the front and back sides 21 and 22 of template 10 so that smooth round bores can be placed completely through the door in one simple operation. Due to the placement of coaxial holes 15 and 16 in both sides of the template, the holes can be cut from both sides of the door. However, they can also be cut from only the front surface of the door so that the holes in the back plate 22 would be superfluous and can be eliminated in other embodiments. Template 10 is further provided, in the embodiment illustrated, with mounting or spotting holes 19 for adjusting or fixing the vertical and lateral placement of the template on the door in use. The edge surface of template 10 in which spotting holes 19 are illustrated can also provide one or more additional routing holes if desired for guiding the routing of holes in the door edge for placement of latches, bolts, and the like.

In a particularly preferred embodiment, the planar opposing sides, 21 and 22, of template 10 are joined at the edge plate 24 such that the spacing of the front and back surfaces, 21 and 22, respectively, illustrated as "Y" is equal to or slightly greater than the thickness of the door with sides 21 and 22 gradually converging away from edge 24 to a smaller dimension "X" which can be slightly less than the thickness of the door. This configuration provides an additional gripping action of the template on the door so that the leading edges of sides 21 and 22 can be expanded to permit placement of the template over the door which, when released, will then grab the front and back surfaces of the door securing template 10 in place as desired.

Also illustrated in FIG. 1 is spacer 27 having two through spotting or attachment holes 28 corresponding to holes 19 in template 10. Spacer 27 has a width slightly less than the interior width of edge 24 of template 10 and a height approximately equal to or somewhat less than the height of template 10 so that spacer 27 can be placed within the template against edge 24 to space holes 15 and 16 slightly outwardly from the position that they would otherwise take when the template is placed on the door edge. For instance, in a particularly preferred embodiment, the centers of holes 15 and 16 are equally spaced from edge 24 at a distance of approximately 2¾ inch which accommodates the spacing of much hardware available for home use. However, other of that hardware requires spacing of holes 15 and 16 (when both holes are used) somewhat closer to the door's edge. When such hardware is to be installed, spacer 27 can be provided having a nominal thickness of ⅜ inch so that the centers of holes 15 and 16 will be spaced approximately ⅜ inch nearer the door edge when cut.

Figure 2:
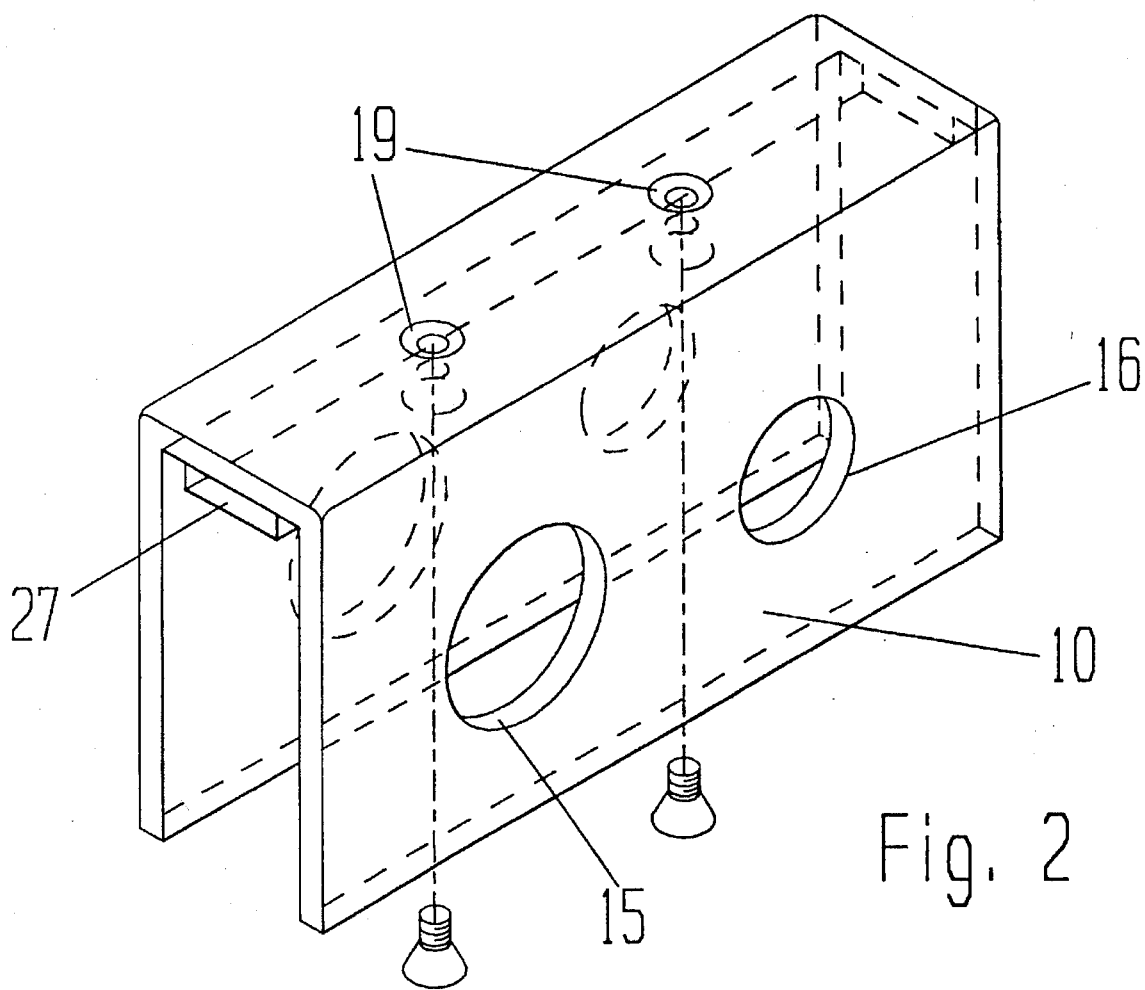
FIG. 2 is an isometric illustration of the template of FIG. 1 mounted on a door edge.
Figure 3:
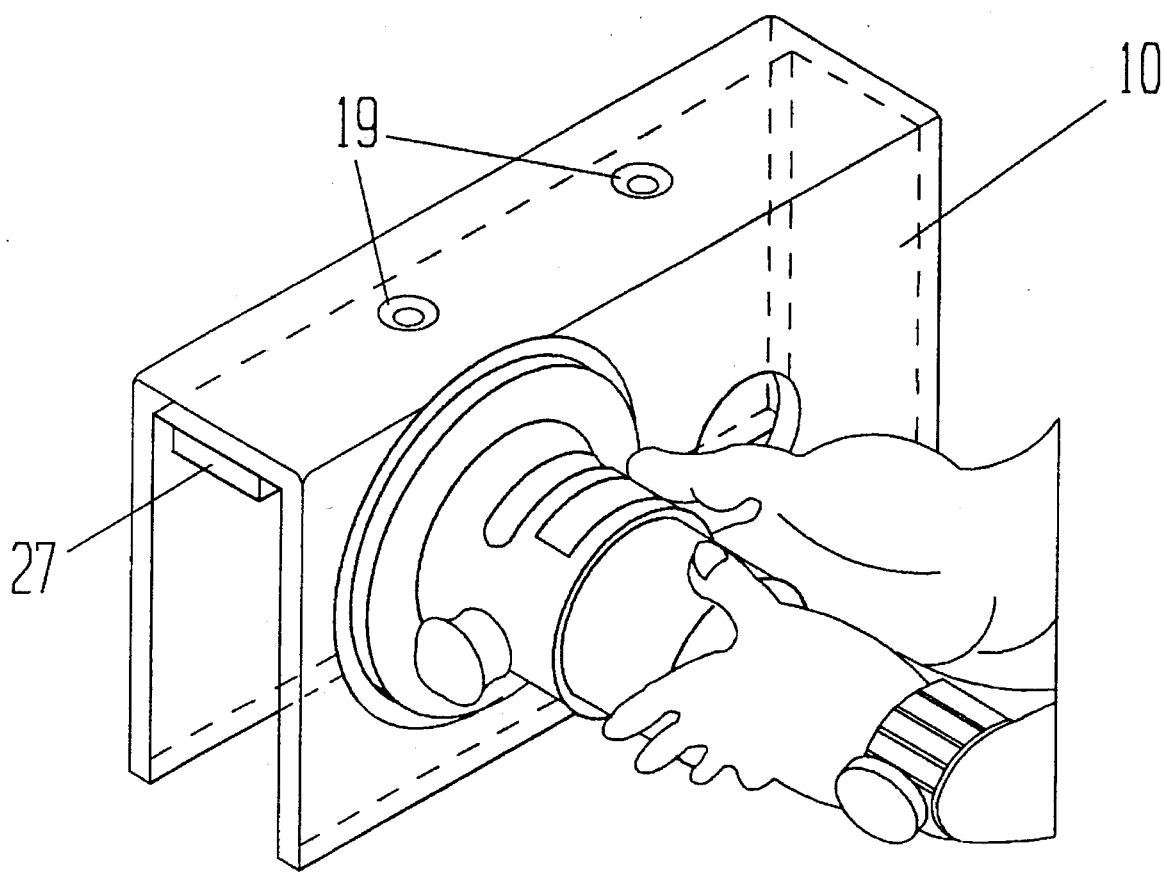
FIG. 3 is an illustration of a router being employed with the template and door combination of FIG. 2.

The template of FIG. 1 is illustrated in FIG. 2 placed over a door edge ready for routing door hardware holes, and that operation is illustrated in FIG. 3. As shown in FIGS. 2 and 3, the template is used in combination with the spacer 27 illustrated in FIG. 1 so that the template edge 24 is slightly elevated from the door edge as the door is aligned on its side, horizontally, as illustrated in FIGS. 2 and 3.

In a particularly preferred embodiment, template 10 is fabricated of a friable (soft), flexible material, such as plastic, so that contact of the router bit with the template during operation will not result in more drastic kick-back of the router and, in particular, will not result in shattering of a carbide bit when employed. On the contrary, if the carbide bit kicks-back and contacts the edge of a plastic template 10, it will merely cut the template without breaking the bit, thereby presenting no hazard to the operator or others in the vicinity. Suitable materials for this preferred embodiment are plastic such as plexiglass, polyethylene, polypropylene, and the wide varieties of acrylics and phenolic resins very well known in the plastics art.

As noted somewhat above, the exterior surfaces of opposing sides 21 and 22 of template 10 should be smooth, unobstructed, and planar so as to provide an unobstructed router bearing surface to ensure smooth router operation. In the most preferred embodiment, the interior surfaces of sides 21 and 22 in addition to the interior surface of edge 24 are also smooth and unobstructed in order to prevent marring of the door surface. This is particularly important when the template is to be used to mount hardware in a finished door.

Although the embodiment illustrated in FIG. 1 shows sides 21 and 22 as being coextensive, the template can be provided with one side extending further away from a door edge than the other and with one or multiple router guide holes presented in only the larger template surface, e.g., front surface 21. In this alternative embodiment, the shorter side, e.g., side 22, of the template should be of sufficient length to overlap the opposing door surface, e.g., by at least about one inch, and thereby provide some stability of template placement.

As another advantageous feature of the templates of this invention, I have found that, due to the construction and manner of operation of most commercially available router bits with collars, a template face thickness less than ¼ inch can exacerbate the problem of router bit kick-back and contact with the template. Accordingly, it is presently preferred that the front and back surfaces 21 and 22 of template 10 have a thickness of at least ¼ inch, preferably at least about ⅜ inch, and usually at least about ⅜ to about ½ inch, at least in the vicinity of router guide holes 15 and 16. I have found that this added thickness reduces the tendency of the bits to contact the template hole edge thereby affording smoother operation, less likelihood of damage to the template, and less likelihood of shattering of the router bit due to such contact.

As noted, in part, above, router holes 15 and 16 can be placed in either one or both sides 21 and 22 of the template, and each template face can present only one or a multiplicity of router guide holes depending on the desired objective. Moreover, the router guide holes can be of any shape: they can be circular or acircular (e.g., non-circular), and thus be elliptical, oblong, and even rectangular in order to enable cutting of holes of various shapes. Square and rectangular holes require a simple finishing operation with a finishing saw to square off the interior edges of the holes.

Guide holes 15 and 16, when used, can be of any desired diameter required to enable placement of the selected hardware, and the use of these templates is particularly advantageous when employed for routing holes of about one inch diameter or greater. Most door mounting hardware requires mounting holes of about 1¼ to about 2½ inch diameter although templates providing holes of much larger diameter can also be provided. Furthermore, the router guide holes can be of different size and different shape on each of the opposing sides 21 and 22 of template 10, and they can be placed on the same or different axes thereby providing a great degree of flexibility in the use of these templates.

When referring to the diameter of the holes other than circular holes, such as the elliptical and oblong holes referred to above, the diameters herein to the minimum diameter of the aperture to be cut.

While guide holes 15 and 16 are often used for placement on centers 2¾ or 2⅜ inches from the door edge, as noted above, larger templates can be provided which reach further away from the door edge and can be employed to place holes even a foot or more into the door, e.g., in the door center. However, most door hardware requires mounting holes inset about 2 to about 4 inches on center.

While various embodiments of this invention have been described, numerous variations and modifications thereof will be readily apparent to one of ordinary skill in the art from the foregoing description, the drawings, and the appended claims, and such variations are intended to be encompassed within the scope of the invention.

I claim:

1. A router template combination of a one-piece door router template comprising a channel-shaped plastic member having two elongated, opposing sides having planar, unobstructed interior surfaces integrally formed with and extending generally perpendicular to an end plate having a mono-planar inside surface and including at least one end plate spotting hole through said end plate; at least one router guide hole having a minimum diameter of at least about one inch in at least one of said elongated, opposing, planar surfaces for guiding the collar of a router bit, and an auxiliary mono-planer spacer plate of a predetermined thickness received within said template against the mono-planar surface of said end plate with a spacer plate spotting hole through said spacer plate aligned with said end plate spotting hole.

2. The router template combination defined in claim 1, wherein the thickness of said planar sides of said template is greater than ¼ inch in the vicinity of said router guide hole to prevent kick-back of said router.

3. The router template combination defined in claim 1, wherein said unitary sides and end plate have a thickness of at least about ⅜ inch in the vicinity of said router guide hole to prevent kick-back of said router.

4. The router template combination defined in claim 1 comprising at least one non-circular guide hole in at least one of said planar sides having a diameter of about 1¼ to about 2½ inch spaced about 2 to 4 inches, on center, from said end plate.

5. A router template combination for routing mounting apertures for operating hardware in a door comprising a one-piece router template formed of plastic and having two elongated, opposing, planar, unobstructed side plates for engaging the front and back sides of said door proximate the edge thereof and being integrally formed with and extending generally perpendicular to an end plate having a substantially mono-planar inside surface for engaging the edge of said door; said opposing sides having at least one router guide hole having a minimum diameter of at least about one inch for guiding the collar of a router bit, and having a thickness greater then ¼ inch, sufficient to prevent router kick-back, in the vicinity of said router guide hole; and an auxiliary mono-planar spacer plate of a predetermined thickness received within said template against the mono-planar surface of said end plate.

6. The router template combination defined in claim 5, wherein said sides are spaced from each other at said end plate by a distance equal to or slightly greater than the thickness of said door at said edge and, when not flexed, converging gradually away from said end plate to a distance slightly less than the thickness of said door; said side plates being flexible relative to each other, whereby the convergent edges of said side plates can be separated by flexing over the leading edge of said door.

7. The router template combination defined in claim 5, wherein said unitary sides have a thickness of at least about ⅜ inch in the vicinity of said router guide hole to prevent kick-back of said router.

8. The router template defined in claim 5, wherein said opposing sides of said template are coextensive and have coaxially aligned holes of approximately the same diameter.

9. A method for forming at least one opening for mounting hardware in a door comprising: placing over the edge of an uncut door a one-piece router template comprising an end plate having a mono-planar surface to engage the edge of said door and at least one end plate hole therethrough, and dependent therefrom, two elongated, planar, unobstructed, opposing side plates which engage the front and back sides of said door proximate to the edge thereof; said opposing side plates having at least one router guide hole having a minimum diameter of about one inch; locating the position of said at least one router guide hole relative to the edge of said door by inserting or removing an auxiliary spacer plate within said template and bearing against said substantially mono-planar surface of said end plate; plunging a router bit through at least said one hole in said side of said template and into said door and guiding said router against said router guide hole to cut in said door an opening defined by said at least one router guide hole.

10. The method of claim 9 wherein said template is secured to said door by resilient grasping of said door by said side plates which are spaced from each other at said end plate by a distance equal to or slightly greater than the thickness of said door and which converge gradually away from said end plate to a spacing slightly less than the thickness of said door.

11. The method defined in claim 10, wherein said opposing side plates of said template have a thickness greater than one quarter inch and are composed of plastic.

12. The method defined in claim 11, wherein said opposing sides of said template have a thickness of at least about ⅜ inch.

13. The method defined in claim 9, wherein at least one of said opposing side plates of said template has at least one non-circular router guide hole therein having a minimum diameter of at least about one inch.

14. The combination of a unitary one-piece door router template for use in routing mounting apertures for operating hardware in planar door surfaces, said template comprising:

two elongated, opposing side plates having planar, unobstructed surfaces for engaging front and back sides of said door proximate the edge thereof integrally formed with and extending generally perpendicular to an end plate for engaging the edge of an uncut door; said opposing side plates being spaced from each other at said end plate by an distance equal to or slightly greater than the thickness of said door and converging gradually away from said end plate to a distance slightly less than the thickness of said door; said side plates being flexible relative to each other, whereby the convergent edges of said side plates can be separated by flexing over the leading edge of said door; at least one router guide hole having a minimum diameter of at least about one inch in at least one of said elongated, opposing, side plates for guiding the collar of a router bit; and an auxiliary mono-planar spacer plate removably received within said template against the mono-planar surface of said end plate to provide adjustability in the location of said guide hole from the edge of said door.

15. The router template combination defined in claim 14, wherein the thickness of said planar sides of said template is greater than ¼ inch in the vicinity of said router guide hole to prevent kick-back of said router.

16. The router template combination defined in claim 14, wherein said unitary sides and end plate have a thickness of at least about ⅜ inch in the vicinity of said router guide hole to prevent kick-back of said router.

* * * * *